(12) United States Patent
Zhao et al.

(10) Patent No.: US 11,711,018 B2
(45) Date of Patent: Jul. 25, 2023

(54) CIRCUIT MODULE AND ELECTRONIC DEVICE

(71) Applicant: HUAWEI TECHNOLOGIES CO., LTD., Guangdong (CN)

(72) Inventors: Wei Zhao, Shenzhen (CN); Jinbo Li, Wuhan (CN); Jie Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/721,491

(22) Filed: Apr. 15, 2022

(65) Prior Publication Data

US 2022/0239227 A1    Jul. 28, 2022

Related U.S. Application Data

(63) Continuation of application No. PCT/CN2020/116502, filed on Sep. 21, 2020.

(30) Foreign Application Priority Data

Dec. 26, 2019    (CN) .......................... 201911373915.6

(51) Int. Cl.
*H02M 3/158*    (2006.01)
*H02J 9/06*    (2006.01)

(52) U.S. Cl.
CPC ............ *H02M 3/1582* (2013.01); *H02J 9/061* (2013.01)

(58) Field of Classification Search
CPC .................................................. H02M 1/0096
See application file for complete search history.

(56) References Cited

U.S. PATENT DOCUMENTS

| 6,504,497 | B2 |   | 1/2003 | Jang et al. |
| 7,872,447 | B2 | * | 1/2011 | Morita ................ H02J 9/061 |
|           |    |   |        | 307/49 |
| 10,992,169 | B2 | * | 4/2021 | Fukae .................. B60R 16/033 |
| 2008/0150483 | A1 |   | 6/2008 | Morita et al. |

(Continued)

FOREIGN PATENT DOCUMENTS

| CN | 202364111 U | 8/2012 |
| CN | 102904437 A | 1/2013 |
| WO | 2019151231 A1 | 8/2019 |

OTHER PUBLICATIONS

Extended European Search Report in European Appln No. 20907231.3, dated Nov. 9, 2022, 9 pages.

(Continued)

*Primary Examiner* — Jeffery S Zweizig
(74) *Attorney, Agent, or Firm* — Fish & Richardson P.C.

(57) ABSTRACT

This application provides example circuit modules and example electronic devices comprising the circuit module. One example circuit module includes a power input terminal, a power output terminal, a first switching transistor, a second switching transistor, a comparison unit, a boost unit, an energy storage unit, and a direct current conversion unit, where the first switching transistor is turned on and the second switching transistor is cut off when a source voltage input by the power input terminal to the comparison unit is greater than the preset threshold, or the first switching transistor is cut off and the second switching transistor is turned on when a source voltage input by the power input terminal to the comparison unit is less than or equal to the preset threshold.

10 Claims, 7 Drawing Sheets

(56) References Cited

U.S. PATENT DOCUMENTS

2010/0120475 A1  5/2010  Taniuchi et al.
2013/0285449 A1  10/2013 Schmidt et al.
2015/0198958 A1  7/2015  Galinski, III
2016/0359359 A1  12/2016 Hsu et al.
2019/0103758 A1  4/2019  Fukae

OTHER PUBLICATIONS

Junbo, "Implementation of Dying Gasp Based on MAX706ESA," Science and Technology Forum, No. 3, 2015, 4 pages (machine English translation).
PCT International Search Report and Written Opinion issued in International Application No. PCT/CN2020/116502 on Dec. 23, 2020, 15 pages (with English translation).

* cited by examiner

CIRCUIT MODULE AND ELECTRONIC DEVICE

CROSS-REFERENCE TO RELATED APPLICATIONS

This application is a continuation of International Application No. PCT/CN2020/116502, filed on Sep. 21, 2020, which claims priority to Chinese Patent Application No. 201911373915.6, filed on Dec. 26, 2019. The disclosures of the aforementioned applications are hereby incorporated by reference in their entireties.

TECHNICAL FIELD

This application relates to the field of communications technologies, and in particular, to a circuit module and an electronic device.

BACKGROUND

In recent years, with the continuous development of communications technologies, the life style of human beings has changed greatly, but people's exploration on communications technologies has never stopped. Status monitoring of a network device is essential to ensuring information stability and security in a communications process. A power failure alarm circuit is an approach for monitoring a status of the network device. To be specific, the power failure alarm circuit monitors a source voltage value of the network device in real time, and when a power failure of the power supply of the network device starts, sends an alarm notification to a network management device or a backup device to maintain information integrity and reliability.

Currently, the power failure alarm circuit is mainly disposed inside the network device. When the power failure of the network device starts, an energy storage component (for example, an energy storage capacitor or an energy storage battery) on the network device is used to supply power, so as to implement a power failure alarm function. Generally, a power failure holding time of the network device is determined by a capacity of an energy storage component. When the network device has very high power consumption, the capacity of the energy storage component needs to be increased to ensure the power failure holding time. For example, an energy storage capacitor with a larger volume needs to be used for replacement or a quantity of energy storage capacitors needs to be increased. Such a manner greatly limits a layout space of a chip.

SUMMARY

Embodiments of this application disclose a circuit module and an electronic device.

According to a first aspect, this application provides a circuit module, including:

a power input terminal, connected to a first input terminal of a first switching transistor, where an output terminal of the first switching transistor is connected to a power output terminal;

the power input terminal is connected to an input terminal of a boost unit, an output terminal of the boost unit is connected to an input terminal of an energy storage unit, an output terminal of the energy storage unit is connected to an input terminal of a direct current conversion unit, an output terminal of the direct current conversion unit is connected to a first input terminal of a second switching transistor, and an output terminal of the second switching transistor is connected to the power output terminal;

the power input terminal is connected to a first input terminal of a comparison unit, a second input terminal of the comparison unit is configured to input a preset threshold, and an output terminal of the comparison unit is connected to a second input terminal of the first switching transistor and a second input terminal of the second switching transistor; and the first switching transistor is turned on and the second switching transistor is cut off when a source voltage input by the power input terminal to the comparison unit is greater than the preset threshold, where the source voltage is output to the power output terminal through the first switching transistor and is boosted by the boost unit to obtain a boosted voltage, and the boosted voltage is input to the energy storage unit for charging to obtain a backup voltage, where the boosted voltage is greater than the source voltage; or the first switching transistor is cut off and the second switching transistor is turned on when a source voltage input by the power input terminal to the comparison unit is less than or equal to the preset threshold, where the energy storage unit outputs a backup voltage to the direct current conversion unit, the backup voltage is bucked by the direct current conversion unit to obtain a converted voltage, and the converted voltage is output to the power output terminal through the second switching transistor, where the converted voltage is equal to the source voltage.

In some possible designs, the energy storage unit includes a Zener diode and an energy storage capacitor, a negative electrode of the Zener diode is connected to the output terminal of the boost unit and the input terminal of the direct current conversion unit, a positive electrode of the Zener diode is grounded, and the Zener diode is connected to the energy storage capacitor in parallel.

In some possible designs, the first switching transistor includes a phase inverter and a first metal oxide semiconductor (MOS) transistor, an input terminal of the phase inverter is connected to the comparison unit, an output terminal of the phase inverter is connected to an enable terminal of the first MOS transistor, an input terminal of the first MOS transistor is connected to the power input terminal, and an output terminal of the first MOS transistor is connected to the power output terminal; and the second switching transistor includes a second MOS transistor, an enable terminal of the second MOS transistor is connected to the output terminal of the comparison unit, an input terminal of the second MOS transistor is connected to the output terminal of the direct current conversion unit, and an output terminal of the second MOS transistor is connected to the power output terminal;

that the first switching transistor is turned on and the second switching transistor is cut off when a source voltage input by the power input terminal to the comparison unit is greater than the preset threshold includes: when the source voltage input by the power input terminal to the comparison unit is greater than the preset threshold, the comparison unit outputs a first level signal, the comparison unit outputs the first level signal to each of the phase inverter and the second MOS transistor, the first level signal passes through the phase inverter to obtain a second level signal, the second level signal is input to the enable terminal of the first MOS transistor so that the first MOS transistor is turned on, and the first level signal is input to the enable terminal of the second MOS transistor so that the second MOS transistor is cut off, where the first level signal and the second level signal are level signals having mutually inverted phases; and that the first switching transistor is cut off and the second switching transistor is turned on when a source voltage input by the power input terminal to the comparison unit is less than or equal to the preset threshold includes: when the source voltage input by the power input terminal to the comparison unit is less than or equal to the preset threshold, the comparison unit outputs the second level signal, the comparison unit outputs the second level signal to each of the phase inverter and the second MOS transistor, the second level signal passes through the phase inverter to obtain the first level signal, the second level signal is input to the enable terminal of the first MOS transistor so that the first MOS transistor is cut off, and the second level signal is input to the enable terminal of the second MOS transistor so that the second MOS transistor is turned on.

In some possible designs, the comparison unit is further configured to send the second level signal when the source voltage input by the power input terminal to the comparison unit is less than or equal to the preset threshold.

In some possible designs, the circuit module is applied to an optical module, and the boost unit is an avalanche photodiode (APD) boost circuit.

It can be learned that, the source voltage is boosted by the boost unit inside the circuit module, and a high voltage obtained after boosting is used to charge the energy storage unit, so that a volume of the energy storage capacitor is reduced without additionally adding a power boost chip. When the circuit module is applied to an optical module, a miniaturization design of the optical module can be implemented.

According to a second aspect, this application provides an electronic device, including an optical module. The optical module includes a power input terminal, a power output terminal, a first switching transistor, a second switching transistor, a comparison unit, a boost unit, an energy storage unit, and a direct current conversion unit, where the power input terminal is connected to a first input terminal of the first switching transistor, and an output terminal of the first switching transistor is connected to the power output terminal;

the power input terminal is connected to an input terminal of the boost unit, an output terminal of the boost unit is connected to an input terminal of the energy storage unit, an output terminal of the energy storage unit is connected to an input terminal of the direct current conversion unit, an output terminal of the direct current conversion unit is connected to a first input terminal of the second switching transistor, and an output terminal of the second switching transistor is connected to the power output terminal;

the power input terminal is connected to a first input terminal of a comparison unit, a second input terminal of the comparison unit is configured to input a preset threshold, and an output terminal of the comparison unit is connected to a second input terminal of the first switching transistor and a second input terminal of the second switching transistor; and the first switching transistor is turned on and the second switching transistor is cut off when a source voltage input by the power input terminal to the comparison unit is greater than the preset threshold, where the source voltage is output to the power output terminal through the first switching transistor and is boosted by the boost unit to obtain a boosted voltage, and the boosted voltage is input to the energy storage unit for charging to obtain a backup voltage, where the boosted voltage is greater than the source voltage; or the first switching transistor is cut off and the second switching transistor is turned on when a source voltage input by the power input terminal to the comparison unit is less than or equal to the preset threshold, where the energy storage unit outputs a backup voltage to the direct current conversion unit, the backup voltage is bucked by the direct current conversion unit to obtain a converted voltage, and the converted voltage is output to the power output terminal through the second switching transistor, where the converted voltage is equal to the source voltage.

In some possible designs, the energy storage unit includes a Zener diode and an energy storage capacitor, a negative electrode of the Zener diode is connected to the output terminal of the boost unit and the input terminal of the direct current conversion unit, a positive electrode of the Zener diode is grounded, and the Zener diode is connected to the energy storage capacitor in parallel.

In some possible designs, the first switching transistor includes a phase inverter and a first MOS transistor, an input terminal of the phase inverter is connected to the comparison unit, an output terminal of the phase inverter is connected to an enable terminal of the first MOS transistor, an input terminal of the first MOS transistor is connected to the power input terminal, and an output terminal of the first MOS transistor is connected to the power output terminal; and the second switching transistor includes a second MOS transistor, an enable terminal of the second MOS transistor is connected to the output terminal of the comparison unit, an input terminal of the second MOS transistor is connected to the output terminal of the direct current conversion unit, and an output terminal of the second MOS transistor is connected to the power output terminal;

that the first switching transistor is turned on and the second switching transistor is cut off when a source voltage input by the power input terminal to the comparison unit is greater than the preset threshold includes: when the source voltage input by the power input terminal to the comparison unit is greater than the preset threshold, the comparison unit outputs a first level signal, the comparison unit outputs the first level signal to each of the phase inverter and the second MOS transistor, the first level signal passes through the phase inverter to obtain a second level signal, the second level signal is input to the enable terminal of the first MOS transistor so that the first MOS transistor is turned on, and the first level signal is input to the enable terminal of the second MOS transistor so that the second MOS transistor is cut off, where the first level signal and the second level signal are level signals having mutually inverted phases; and that the first switching transistor is cut off and the second switching transistor is turned on when a source voltage input by the power input terminal to the comparison unit is less than or equal to the preset threshold includes: when the source voltage input by the power input terminal to the comparison unit is less than or equal to the preset threshold, the comparison unit outputs the second level signal, the comparison unit outputs the second level signal to each of the phase inverter and the second MOS transistor, the second level signal passes through the phase inverter to obtain the first level signal, the second level signal is input to the enable terminal of the first MOS transistor so that the first MOS transistor is cut off, and the second level signal is input to the enable terminal of the second MOS transistor so that the second MOS transistor is turned on.

In some possible designs, the comparison unit is further configured to send the second level signal when the source voltage input by the power input terminal to the comparison unit is less than or equal to the preset threshold.

In some possible designs, the boost unit is an APD boost circuit.

It can be learned that, when the optical module is disposed in the electronic device, and a high voltage output by the APD boost circuit is used in the optical module to charge the energy storage capacitor, the energy storage capacitor can be used to supply power to the optical module upon a power failure of the source voltage of the optical module. In the foregoing electronic device, because the high voltage output by the APD boost circuit inside the optical module is used to charge the energy storage capacitor, a capacity of the energy storage capacitor can be reduced without additionally adding a power boost chip, so that a volume of the energy storage capacitor is greatly reduced, and a volume of the optical module is also accordingly reduced, thereby reducing manufacturing costs.

BRIEF DESCRIPTION OF DRAWINGS

To describe the technical solutions in embodiments of this application more clearly, the following briefly describes the accompanying drawings for describing the embodiments. Apparently, the accompanying drawings in the following description show some embodiments of this application, and a person of ordinary skill in the art may still derive another drawing from these accompanying drawings without creative efforts.

DESCRIPTION OF EMBODIMENTS

For ease of understanding the embodiments of this application, specific application of the embodiments of this application to various application scenarios is first separately described by using examples.

(1) An Optical Module is Used as an Example

An optical module is an optical-to-electrical conversion apparatus, and usually needs to be installed in an optical communications device (such as an optical network unit or an optical transceiver). The optical module is configured to convert an electrical signal in the optical communications device into an optical signal or convert an optical signal received by the optical communications device into an electrical signal. When the optical module is faulty, data transmission may be affected, and services between optical communications devices cannot run normally. A power supply fault of the optical module is one of common faults.

Figure 1A:
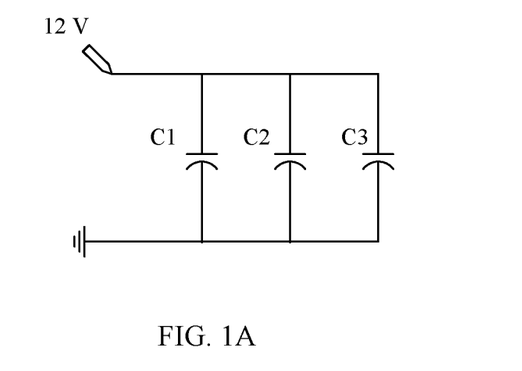
FIG. 1A shows a possible power failure alarm manner according to this application.
Figure 1B:
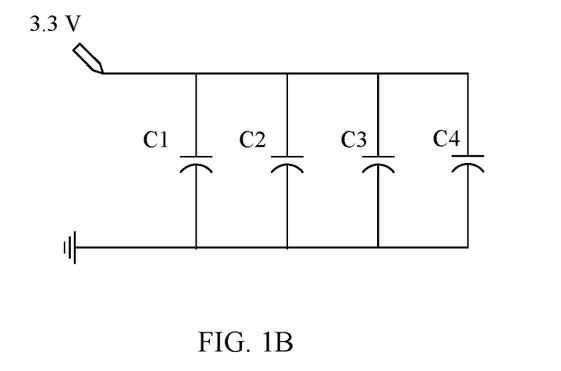
FIG. 1B shows a possible power failure alarm manner according to this application.

It should be noted that, the power supply fault of the optical module is a fault caused by a power failure of an external power supply of the optical module. When an external power supply of the optical module encounters a power failure, the optical module still needs to maintain an operating status. In other words, the optical module needs to save its current running status within a power failure holding time, and report its power failure. In a possible implementation, a power failure alarm circuit is disposed on a power bus of the optical communications device (for example, an optical network unit (ONU)) on which the optical module is installed. To be specific, one or more energy storage capacitors are connected in parallel between a power input terminal and a ground terminal of the optical communications device. A capacity of the energy storage capacitor may be 1 mF, 10 μF, 150 μF, or the like. FIG. 1A is used as an example. A source voltage input by the power input terminal of the optical communications device in which the optical module is located is 12 V. The power input terminal of the optical communications device is connected to one terminal of each of energy storage capacitors $C_1$, $C_2$, $C_3$. The energy storage capacitors $C_1$, $C_2$, $C_3$ are connected in parallel. The other terminal of each of the energy storage capacitors $C_1$, $C_2$, $C_3$ is grounded. A capacitance of each of the energy storage capacitors $C_1$, $C_2$, $C_3$ is 1 mF. In another possible implementation, a power failure alarm circuit is disposed on a power bus of the optical module. To be specific, one or more energy storage capacitors are connected in parallel between a power input terminal and a ground terminal of the optical module. FIG. 1B is used as an example. A source voltage input by the power input terminal of the optical module is 3.3 V. The power input terminal of the optical module is connected to one terminal of each of energy storage capacitors $C_1$, $C_2$, $C_3$, $C_4$. The energy storage capacitors $C_1$, $C_2$, $C_3$, $C_4$ are connected in parallel. The other terminal of each of the energy storage capacitors $C_1$, $C_2$, $C_3$, $C_4$ is grounded. A capacitance of each of the energy storage capacitors $C_1$, $C_2$, $C_3$, $C_4$ is 1 mF.

It can be seen that, in the circuit shown in FIG. 1A, the source voltage of the optical communications device is used to charge the energy storage capacitors $C_1$, $C_2$, $C_3$. When the source voltage of the optical module encounters a power failure, the energy storage capacitors $C_1$, $C_2$, $C_3$ are discharged to supply power to the optical module. However, as the energy storage capacitors $C_1$, $C_2$, $C_3$ are connected between the power input terminal and the ground terminal of the optical communications device, the energy storage capacitors $C_1$, $C_2$, $C_3$ supply power to another normally operating component while supplying power to the optical module. In other words, the energy storage capacitors $C_1$, $C_2$, $C_3$ supply power to the entire optical communications device when being discharged. Therefore, this manner may increase power consumption. Similarly, it can be seen that, in the circuit shown in FIG. 1B, when a power failure of the source voltage of the optical module starts, the energy storage capacitors $C_1$, $C_2$, $C_3$, $C_4$ are discharged to supply power to the entire optical module. Compared with the circuit shown in FIG. 1A, the circuit in FIG. 1B has a significantly increased quantity of energy storage capacitors. This is because: in FIG. 1A, a 12 V source voltage is used to charge the energy storage capacitors, whereas in FIG. 1B, only a 3.3 V source voltage is used to charge the energy storage capacitors. It can be learned based on the law of charge conservation that, in the circuit shown in FIG. 1B, more energy storage capacitors or energy storage capacitors with a larger capacitance are required to ensure that the optical module can continue to operate within a power failure alarm time. Compared with the circuit shown in FIG. 1B, in the circuit in FIG. 1A, the energy storage capacitors supply power to the entire optical communications device whereas the energy storage capacitors in the circuit in FIG. 1B supply power only to the optical module. Consequently, power consumption in FIG. 1A is obviously greater than power consumption in FIG. 1B. In other words, although the circuit in FIG. 1A uses a 12 V source voltage to store power for the energy storage capacitors, due to the excessively large power consumption in FIG. 1A, a quantity of energy storage capacitors and the capacitance of the energy storage capacitors in FIG. 1A are not reduced. The foregoing two manners can implement a power failure alarm when the source voltage of the optical module encounters a power failure. However, in the two manners, capacities of the energy storage capacitors are large and the quantity of energy storage capacitors is large. A package volume of the energy storage capacitors increases. Consequently, a volume of the optical communications device or the optical module also increases accordingly. This not only fails to meet a trend of device miniaturization development, but also increases device costs.

(2) A Power Supply Energy Storage Scenario is Used as an Example

Similarly, the embodiments of this application may also be applied to a power supply energy storage scenario, for example, power supply energy storage of a real-time clock (RTC) chip. An RTC is a counter used to output actual time, so as to provide an accurate time reference for an electronic device. Generally, a backup battery is disposed in the RTC chip. When a main power supply of the RTC chip encounters a power failure, the backup battery may be used to continue to output time for a system. However, when power in the RTC battery is exhausted, the RTC battery needs to be replaced with a new one. To ensure power supply duration of the backup battery, the backup battery usually has a relatively large volume, and consequently occupies a relatively large space in the RTC chip.

Therefore, to resolve the foregoing problem that a volume of an electronic device increases due to a large volume of an energy storage component, this application provides a circuit module. The circuit module can charge an energy storage capacitor by using a high voltage in a circuit, and when a source voltage input by a power input terminal encounters a power failure, uses the energy storage capacitor as a backup power supply. This not only reduces a requirement on a capacity of the energy storage capacitor, but also reduces power consumption, thereby greatly reducing a volume of the energy storage capacitor. In this way, the energy storage capacitor accordingly occupies a reduced space on a printed circuit board (PCB) of an internal chip of an electronic device, thereby further reducing development costs of the electronic device, and meeting a development trend of device miniaturization.

The circuit module provided in this application is described below with reference to specific embodiments.

Figure 2:
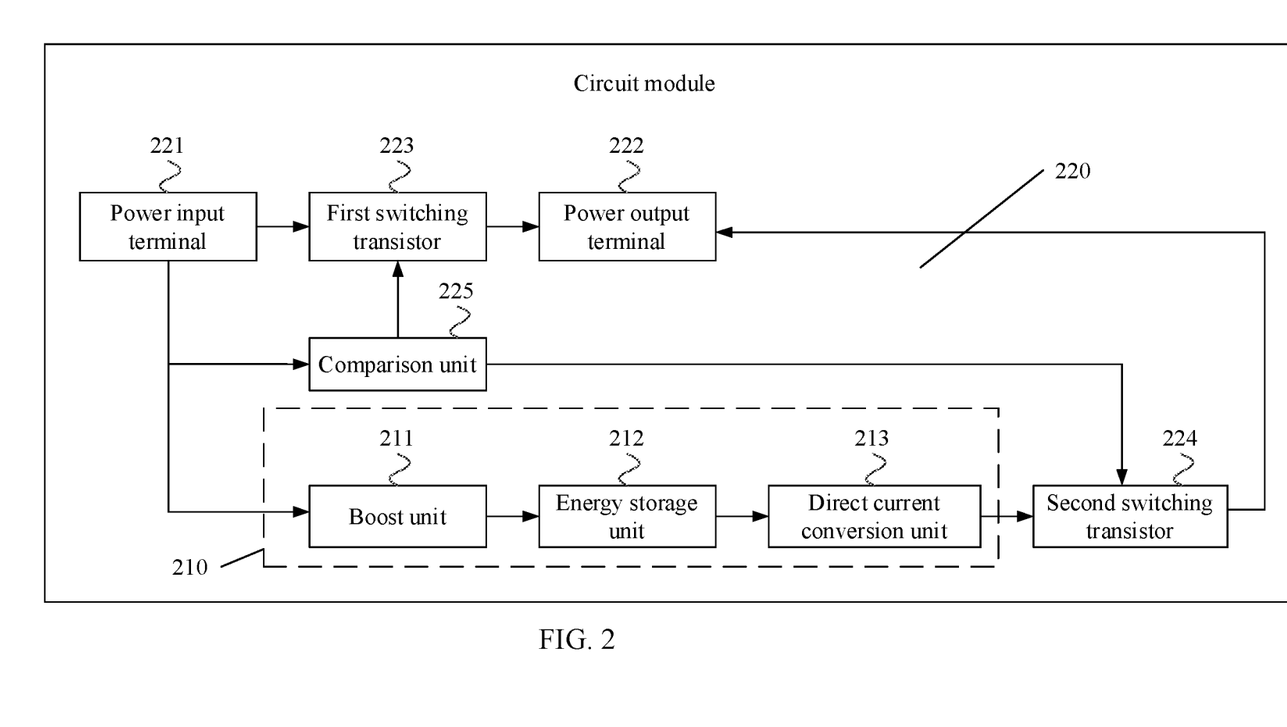
FIG. 2 shows a circuit module according to this application.

FIG. 2 shows a circuit module according to this application. The circuit module may be divided into two parts: a backup power supply circuit module 210 (as shown in a dashed box) and a switch control circuit module 220. The backup power supply circuit module 210 includes a boost unit 211, an energy storage unit 212, and a direct current conversion unit 213. The switch control circuit module 220 includes a power input terminal 221, a power output terminal 222, a first switching transistor 223, a second switching transistor 224, and a comparison unit 225. The circuit module has the following connection relationship:

the power input terminal 221 is connected to a first input terminal of the first switching transistor 223, and an output terminal of the first switching transistor 223 is connected to the power output terminal 222;

the power input terminal 221 is connected to an input terminal of the boost unit 211, an output terminal of the boost unit 211 is connected to an input terminal of the energy storage unit 212, an output terminal of the energy storage unit 212 is connected to an input terminal of the direct current conversion unit 213, an output terminal of the direct current conversion unit 213 is connected to a first input terminal of the second switching transistor 224, and an output terminal of the second switching transistor 224 is connected to the power output terminal 222;

the power input terminal 221 is connected to a first input terminal of the comparison unit 225, a second input terminal of the comparison unit 225 is configured to input a preset threshold, and an output terminal of the comparison unit 225 is connected to a second input terminal of the first switching transistor 223 and a second input terminal of the second switching transistor 224; and the first switching transistor 223 is turned on and the second switching transistor 224 is cut off when a source voltage input by the power input terminal 221 to the comparison unit 225 is greater than the preset threshold, where the source voltage is output to the power output terminal 222 through the first switching transistor 223 and is boosted by the boost unit 211 to obtain a boosted voltage, and the boosted voltage is input to the energy storage unit 212 for charging to obtain a backup voltage, where the boosted voltage is greater than the source voltage; or the first switching transistor 223 is cut off and the second switching transistor 224 is turned on when a source voltage input by the power input terminal 221 to the comparison unit 225 is less than or equal to the preset threshold, where the energy storage unit 212 outputs a backup voltage to the direct current conversion unit 213, the backup voltage is bucked by the direct current conversion unit 213 to obtain a converted voltage, and the converted voltage is output to the power output terminal 222 through the second switching transistor 224, where the converted voltage is equal to the source voltage.

In a specific embodiment, the energy storage unit 212 includes one or more energy storage components; and the energy storage unit 212 may charge the energy storage component by using the boosted voltage output by the boost unit 211, and when the source voltage is less than or equal to the preset threshold, output the backup voltage.

In a more specific embodiment, the energy storage unit 212 includes a Zener diode and an energy storage capacitor, a negative electrode of the Zener diode is connected to the output terminal of the boost unit 211 and the input terminal of the direct current conversion unit 213, a positive electrode of the Zener diode is grounded, and the Zener diode is connected to the energy storage capacitor in parallel.

In a specific embodiment, the first switching transistor 223 is configured to control the source voltage to be input to the power output terminal 222; and the second switching transistor 224 is configured to control the backup voltage to be input to the power output terminal 222. Specifically, when the source voltage is greater than the preset threshold, the first switching transistor controls the source voltage to flow to the power output terminal 222, and the second switching transistor controls the backup voltage not to flow to the power output terminal 222. When the source voltage is less than or equal to the preset threshold, the first switching transistor controls the source voltage not to be output to the power output terminal 222, and the second switching transistor controls the backup voltage to be output to the power output terminal 222.

In a more specific embodiment, the first switching transistor 223 includes a phase inverter and a first MOS transistor, an input terminal of the phase inverter is connected to the comparison unit 225, an output terminal of the phase inverter is connected to an enable terminal of the first MOS transistor, an input terminal of the first MOS transistor is connected to the power input terminal 221, and an output terminal of the first MOS transistor is connected to the power output terminal 222; and the second switching transistor 224 includes a second MOS transistor, an enable terminal of the second MOS transistor is connected to the output terminal of the comparison unit 225, an input terminal of the second MOS transistor is connected to the output terminal of the direct current conversion unit 213, and an output terminal of the second MOS transistor is connected to the power output terminal 222;

when the source voltage input by the power input terminal 221 to the comparison unit 225 is greater than the preset threshold, the comparison unit 225 outputs a first level signal, the comparison unit 225 outputs the first level signal to each of the phase inverter and the second MOS transistor, the first level signal passes through the phase inverter to obtain a second level signal, the second level signal is input to the enable terminal of the first MOS transistor so that the first MOS transistor is turned on, and the first level signal is input to the enable terminal of the second MOS transistor so that the second MOS transistor is cut off, where the first level signal and the second level signal are level signals having mutually inverted phases; and when the source voltage input by the power input terminal 221 to the comparison unit 225 is less than or equal to the preset threshold, the comparison unit 225 outputs the second level signal, the comparison unit 225 outputs the second level signal to each of the phase inverter and the second MOS transistor, the second level signal passes through the phase inverter to obtain the first level signal, the second level signal is input to the enable terminal of the first MOS transistor so that the first MOS transistor is cut off, and the second level signal is input to the enable terminal of the second MOS transistor so that the second MOS transistor is turned on.

In a specific embodiment, the comparison unit 225 is configured to determine whether the source voltage encounters a power failure. The comparison unit may be a combination of a comparator and a filter, or may be implemented by a power fail input (PFI) detection function built in an integrated circuit (IC) chip, or the like. This is not specifically limited herein.

In a specific embodiment, the comparison unit 225 is further configured to send the second level signal when the source voltage input by the power input terminal 221 to the comparison unit 225 is less than or equal to the preset threshold.

In a specific embodiment, the boost unit 211 is configured to perform voltage boosting processing on the source voltage to obtain the boosted voltage, so as to charge the energy storage component in the energy storage unit. It should be understood that, the boost unit 211 is not only configured to charge the energy storage component, but also configured to complete normal work of the circuit.

In a more specific embodiment, the circuit module is applied to an optical module, and the boost unit 211 is an APD boost circuit. The APD is a photosensitive component used in laser communications, and is configured to amplify a photoelectric signal to improve detection sensitivity. When a reverse bias voltage is applied to a p-n junction of the APD, incident light is absorbed by the p-n junction to form a photocurrent. When the reverse bias voltage is increased, an "avalanche" (that is, the photocurrent surges exponentially) phenomenon is generated. Therefore, the APD boost circuit is configured to provide a high reverse bias voltage for the APD, so as to increase the photocurrent. It should be understood that, the circuit module may be further applied to a power supply energy storage scenario inside a chip, for example, backup power supply energy storage of the RTC chip.

In a specific embodiment, the backup voltage output by the energy storage unit may be greater than the source voltage. Therefore, the direct current conversion unit 213 is configured to buck the backup voltage to obtain the converted voltage. In this way, when the source voltage encounters a power failure, the converted voltage is used to supply power to the device. The direct current conversion unit is a buck circuit (for example, a buck chopper circuit).

It should be noted that, "connection" mentioned in the foregoing embodiments may be a direct connection or an indirect connection. In other words, "connection" may mean that units are directly connected to each other by using a wire, or units are connected to each other by using one or more components (for example, resistors). For example, the output terminal of the boost unit 211 is connected to the input terminal of the energy storage unit 212. This may mean the following: The output terminal of the boost unit 211 is connected to the input terminal of the energy storage unit 212, or the output terminal of the boost unit 211 is connected to one terminal of a current-limiting resistor, and the other terminal of the current-limiting resistor is connected to the input terminal of the energy storage unit 212. There may be one or more current-limiting resistors. This is not specifically limited herein.

It should be understood that, the first switching transistor may be a combination of the first MOS transistor and a triode, or may be a combination of the first MOS transistor and a transistor-transistor logic (TTL) NOT gate, or may be a switching triode, or the like. Similarly, the second switching transistor may be the second MOS transistor, or may be a switching triode, or the like. This is not specifically limited herein. In addition, the MOS transistor may be a positive-channel metal oxide semiconductor (PMOS) transistor or a negative-channel metal oxide semiconductor ( ) transistor. A triode may be an NPN triode or a PNP triode. This is not specifically limited herein.

It should be further understood that, the direct current conversion unit 213 may be a buck circuit, and the buck circuit may be a buck chopper converter, a buck-boost converter, a Cuk converter, or the like. This is not specifically limited herein. The boost unit may be specifically a boost chopper converter, a single-ended primary inductance converter (SEPIC), a flyback converter, or the like. This is not specifically limited herein. In addition, the boost unit 211 needs to be specifically determined based on a specific application scenario. For example, the boost unit in the optical module is an APD boost circuit.

In the foregoing circuit module, the source voltage is boosted by the boost unit inside the circuit module, and a high voltage obtained after boosting is used to charge the energy storage unit, so that a volume of the energy storage capacitor is reduced without additionally adding a power boost chip. When the circuit module is applied to an optical module, a miniaturization design of the optical module can be implemented. In addition, by using the first switching transistor and the second switching transistor, statuses of the source voltage upon normal power supply and upon a power failure can be better adapted, thereby reducing power consumption.

With reference to the circuit module shown in FIG. 2, the following uses some more specific scenarios for example description.

Figure 3:
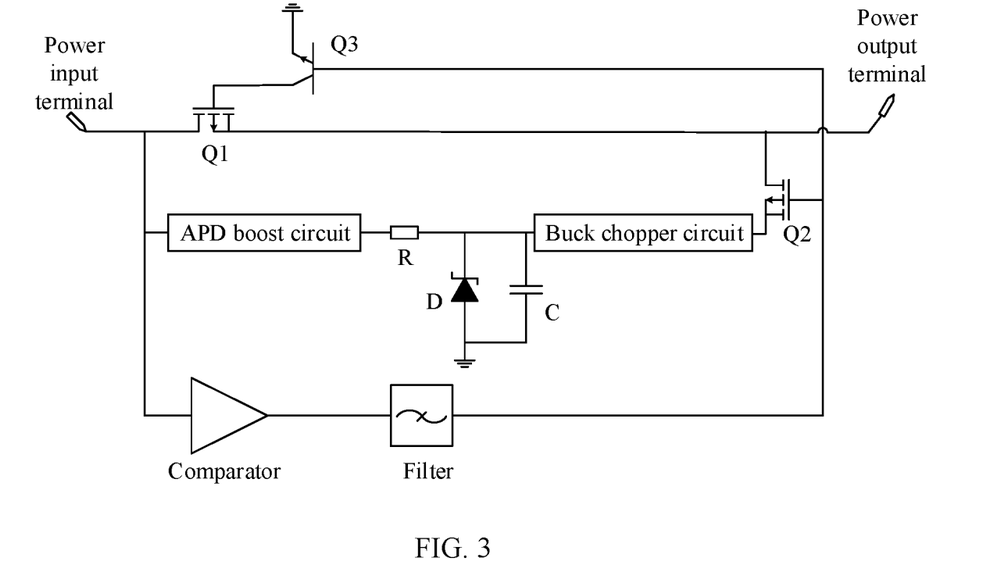
FIG. 3 shows a possible power failure alarm circuit according to this application.

FIG. 3 is a circuit block diagram of a power failure alarm circuit according to this application. The power failure alarm circuit includes a MOS transistor Q1, a MOS transistor Q2, a triode Q3, a current-limiting resistor R, a Zener diode D, an energy storage capacitor C, a boost circuit, a buck circuit, a comparator, and a filter. The MOS transistor Q1 and the triode Q3 form the first switching transistor in FIG. 2. The MOS transistor Q2 is the second switching transistor in FIG. 2. The Zener diode D and the energy storage capacitor C form the energy storage unit in FIG. 2. The boost circuit is the boost unit in FIG. 2. The buck chopper circuit is the direct current conversion unit in FIG. 2. The comparator and the filter form the comparison unit in FIG. 2.

In a specific embodiment, assuming that both the MOS transistor Q1 and the MOS transistor Q2 are PMOS transistors, and the triode Q3 is an NPN triode, the power failure alarm circuit has the following specific connection relationship:

(1) A power input terminal is connected to a drain of the MOS transistor Q1, a source of the MOS transistor Q1 is connected to a power output terminal, a gate of the MOS transistor Q1 is connected to a collector of the triode Q3, an emitter of the triode Q3 is grounded, and a base of the triode Q3 is connected to an output terminal of the filter.

(2) The power input terminal is connected to a first input terminal of the comparator, a second input terminal of the comparator is configured to input a preset threshold, and an output terminal of the comparator is connected to the output terminal of the filter.

(3) The power input terminal is connected to an input terminal of the APD boost circuit, an output terminal of the APD boost circuit is connected to one terminal of the current-limiting resistor R, the other terminal of the current-limiting resistor R is connected to a negative electrode of the Zener diode D and an input terminal of the buck circuit, a positive electrode of the Zener diode D is grounded, the Zener diode D is connected to the energy storage capacitor C in parallel, an output terminal of the buck circuit is connected to a source of the MOS transistor Q2, a drain of the MOS transistor Q2 is connected to the power output terminal, and a gate of the MOS transistor Q2 is connected to the output terminal of the filter.

A working process of the power failure alarm circuit shown in FIG. 3 is described in detail below.

Step 1: When a source voltage input by the power input terminal to the comparator is greater than the preset threshold, the comparator outputs a high level signal, and the high level signal is filtered by the filter to eliminate a jitter of the level signal, so as to obtain a stable high level signal; and the filter outputs the stable high level signal to each of the MOS transistor Q2 and the triode Q3, where when the gate of the MOS transistor Q2 receives the high level signal, the MOS transistor Q2 is cut off; and when the base of the triode Q3 receives the high level signal, the triode Q3 is cut off, the collector of the triode Q3 outputs a low level and outputs the low level signal to the MOS transistor Q1, and after the gate of the MOS transistor Q1 receives the low level signal, the MOS transistor Q1 is turned on, so that the source voltage is output to the power output terminal through the MOS transistor Q1. In addition, the source voltage is input to the boost circuit, and is boosted by the boost circuit to obtain a boosted voltage. Because the energy storage capacitor C may be broken down if the energy storage capacitor C is directly charged by using the boosted voltage, the current-limiting resistor R may be used to limit a size of a charging current. Subsequently, the Zener diode D may be used to stabilize a charging voltage to a fixed voltage, and then the energy storage capacitor C is charged to obtain a backup voltage. After the backup voltage is bucked by the buck circuit, a converted voltage equal to the source voltage is obtained. It should be noted that, because the MOS transistor Q2 is cut off, the converted voltage cannot be output to the power output terminal.

Step 2: When the source voltage input by the power input terminal to the comparator is less than or equal to the preset threshold, the comparator outputs a low level, and the low level signal is filtered by the filter to obtain a stable low level signal; and the filter outputs the stable low level signal to each of the MOS transistor Q2 and the triode Q3, where when the gate of the MOS transistor Q2 receives the low level signal, the MOS transistor Q2 is turned on, so that a backup voltage is output to the power output terminal through the MOS transistor Q2; and when the base of the triode Q3 receives the low level signal, the triode Q3 is turned on, the collector of the triode Q3 outputs a high level and outputs the high level signal to the MOS transistor Q1, and after the gate of the MOS transistor Q1 receives the high level signal, the MOS transistor Q1 is cut off, so that the source voltage input by the power input terminal cannot be output to the power output terminal through the MOS transistor Q1. In addition, because the source voltage input by the power input terminal to the comparator is less than or equal to the preset threshold, that is, the source voltage input by the power input terminal encounters a power failure, the source voltage is less than a driving voltage of the boost circuit, and the boost circuit cannot boost the source voltage. Consequently, energy storage on the energy storage capacitor cannot be continued.

It should be understood that, the foregoing circuit is merely used as an example. In actual application, there may be one or more MOS transistors and one or more triodes. The MOS transistor Q1 may be a PMOS transistor or an NMOS transistor. The MOS transistor Q2 may be a PMOS transistor or an NMOS transistor. The MOS transistor Q1 and the MOS transistor Q2 may have a same type or different types. The triode may be an NPN triode or a PNP triode. In addition, other switching components may be further used to replace the MOS transistors and the triode. This is not specifically limited herein. Similarly, quantities of other components (such as the energy storage capacitor and the current-limiting resistor) in the circuit each may be 1 or above, and need to be determined based on an actual situation. This is not specifically limited herein.

For ease of understanding a power failure alarm effect in the embodiments of this application, the following provides a detailed description by using specific experimental data.

A test condition is as follows: The power failure alarm circuit shown in FIG. 3 is applied to an optical module. In addition, the source voltage input by the power input terminal is 3.3 V, a resistance of the current-limiting resistor R is 18 KΩ a capacitance of the energy storage capacitor C is 150 μF, the boost circuit is an APD boost circuit, and the power output terminal is connected to a 1 A load. A test result is as follows:

When the source voltage is 3.3 V, a boosted voltage output by the APD boost circuit is 25 V to 35 V, and an 11 V backup voltage can be obtained after the boosted voltage passes through the current-limiting resistor R.

Figure 4:
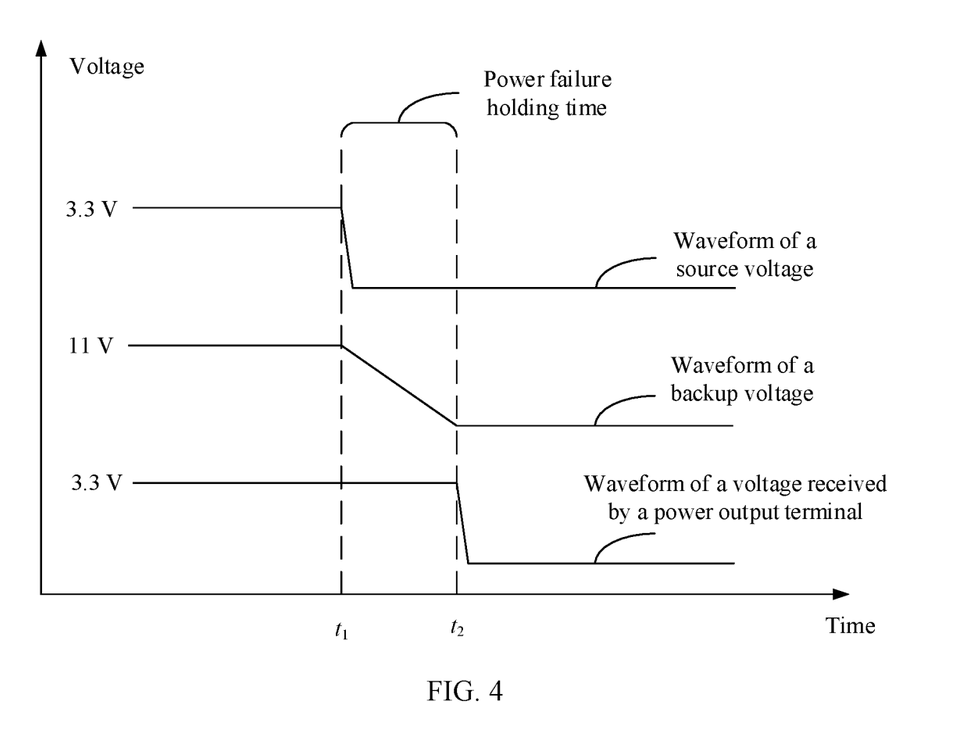
FIG. 4 is a schematic diagram of a test result according to this application.

When a power failure of the source voltage starts from a moment $t_1$, as shown in FIG. 4, the backup voltage drops from 11 V, but a voltage output by the power output terminal is still 3.3 V. The voltage output by the power output terminal does not drop until a moment $t_2$. Therefore, it can be learned that, a power failure holding time is $t_2-t_1$. In addition, it is found from the test that, a power failure holding time obtained under the foregoing test condition is 2.1 ms, and the circuit may be used in an industrial-grade environment (−40° C. to 85° C.).

Figure 5:
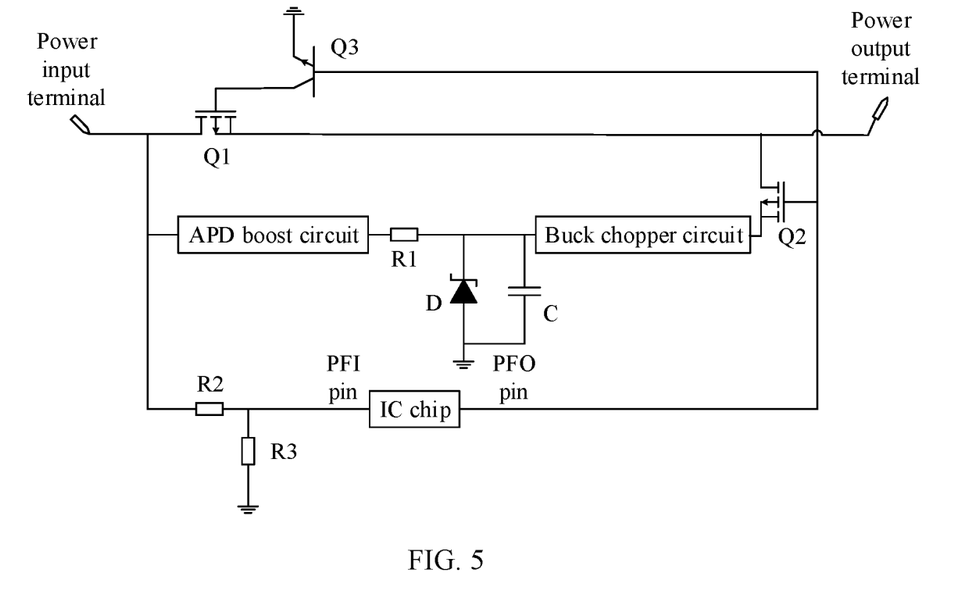
FIG. 5 shows a possible power failure alarm circuit according to this application.
Figure 6:
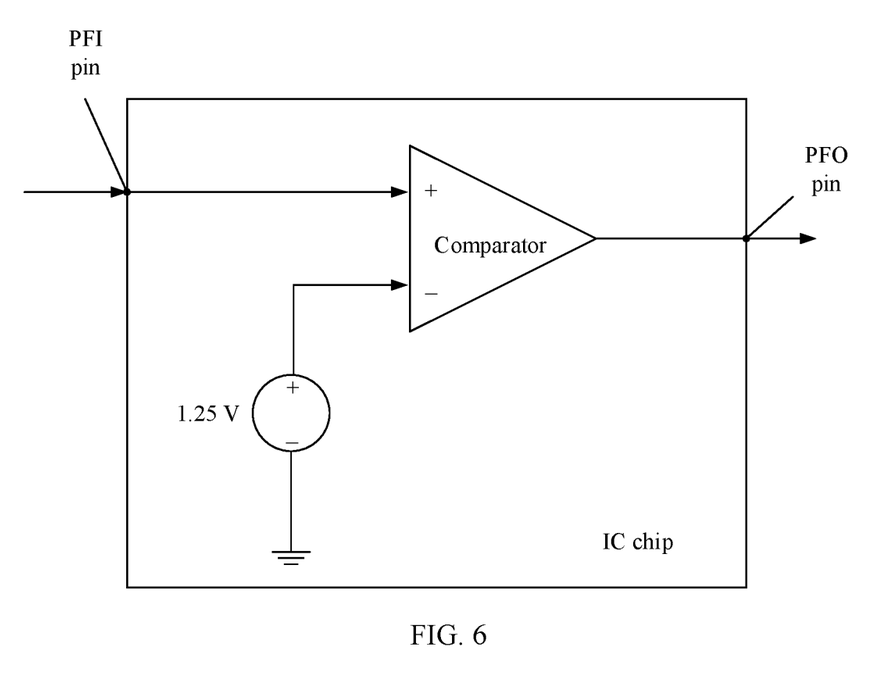
FIG. 6 is a schematic diagram of a possible comparison unit according to this application.

FIG. 5 is a circuit block diagram of another power failure alarm circuit according to this application. The power failure alarm circuit includes a MOS transistor Q1, a MOS transistor Q2, a triode Q3, a current-limiting resistor R1, a Zener diode D, an energy storage capacitor C, a boost circuit, a buck circuit, a voltage divider resistor R2, a voltage divider resistor R3, and an IC chip. The MOS transistor Q1 and the triode Q3 form the first switching transistor in FIG. 2. The MOS transistor Q2 is the second switching transistor in FIG. 2. The Zener diode D and the energy storage capacitor C form the energy storage unit in FIG. 2. The boost circuit is the boost unit in FIG. 2. The buck chopper circuit is the direct current conversion unit in FIG. 2. The IC chip is equipped with a PFI detection function and has a comparator function inside (as shown in FIG. 6), and therefore the IC chip may be used to replace the comparison unit in FIG. 2.

In a specific embodiment, assuming that both the MOS transistor Q1 and the MOS transistor Q2 are PMOS transistors, and the triode Q3 is an NPN triode, the power failure alarm circuit has the following specific connection relationship:

(1) A power input terminal is connected to a drain of the MOS transistor Q1, a source of the MOS transistor Q1 is connected to a power output terminal, a gate of the MOS transistor Q1 is connected to a collector of the triode Q3, an emitter of the triode Q3 is grounded, and a base of the triode Q3 is connected to a power fail output (PFO) pin of the IC chip.

(2) The power input terminal is connected to one terminal of the voltage divider resistor R2, the other terminal of the voltage divider resistor R2 is connected to a PFI pin of the IC chip and one terminal of the voltage divider resistor R3, and the other terminal of the voltage divider resistor R3 is grounded.

(3) The power input terminal is connected to an input terminal of the boost circuit, an output terminal of the boost circuit is connected to one terminal of the current-limiting resistor R1, the other terminal of the current-limiting resistor R is connected to a negative electrode of the Zener diode D and an input terminal of the buck circuit, a positive electrode of the Zener diode D is grounded, the Zener diode D is connected to the energy storage capacitor C in parallel, an output terminal of the buck circuit is connected to a source of the MOS transistor Q2, a drain of the MOS transistor Q2 is connected to the power output terminal, and a gate of the MOS transistor Q2 is connected to the PFO pin of the IC chip.

A working process of the power failure alarm circuit shown in FIG. 5 is described in detail below.

Step 1: When a voltage received by the PFI pin of the IC chip is greater than the preset threshold, the PFO pin of the IC chip outputs a high level and outputs the high level signal to each of the MOS transistor Q2 and the triode Q3, where when the gate of the MOS transistor Q2 receives the high level signal, the MOS transistor Q2 is cut off; and when the base of the triode Q3 receives the high level signal, the triode Q3 is cut off, the collector of the triode Q3 outputs a low level and outputs the low level signal to the MOS transistor Q1, and after the gate of the MOS transistor Q1 receives the low level signal, the MOS transistor Q1 is turned on, so that the source voltage input by the power input terminal is output to the power output terminal through the MOS transistor Q1. In addition, the source voltage input by the power input terminal is input to the boost circuit, and is boosted by the boost circuit to obtain a boosted voltage. Because the energy storage capacitor C may be broken down if the energy storage capacitor C is directly charged by using the boosted voltage, the current-limiting resistor R may be used to limit a size of a charging current. Subsequently, the Zener diode D may be used to stabilize a charging voltage to a fixed voltage, and then the energy storage capacitor C is charged to obtain a backup voltage. After the backup voltage is bucked by the buck circuit, a converted voltage equal to the source voltage is obtained. It should be noted that, because the MOS transistor Q2 is cut off, the converted voltage cannot be output to the power output terminal.

Step 2: When the voltage received by the PFI pin of the IC chip is less than or equal to the preset threshold, the PFO pin of the IC chip outputs a low level and outputs the low level signal to each of the MOS transistor Q2 and the triode Q3, where when the gate of the MOS transistor Q2 receives the low level signal, the MOS transistor Q2 is turned on, so that a backup voltage is output to the power output terminal through the MOS transistor Q2; and when the base of the triode Q3 receives the low level signal, the triode Q3 is turned on, the collector of the triode Q3 outputs a high level and outputs the high level signal to the MOS transistor Q1, and after the gate of the MOS transistor Q1 receives the high level signal, the MOS transistor Q1 is cut off, so that the source voltage input by the power input terminal cannot be output to the power output terminal through the MOS transistor Q1. It should be noted that, because the voltage received by the PFI pin of the IC chip is less than or equal to the preset threshold, that is, the source voltage input by the power input terminal encounters a power failure, the source voltage is less than a driving voltage of the boost circuit, and the boost circuit cannot boost the source voltage. Consequently, energy storage on the energy storage capacitor cannot be continued.

It should be noted that, one terminal of a comparator inside the IC chip is connected to a constant reference voltage (for example, 1.25 V), and the other terminal serves as a PFI pin. The voltage received by the PFI pin of the IC chip is a voltage obtained after the source voltage passes through the voltage divider resistor R2 and the voltage divider resistor R3.

It should be understood that, the foregoing circuit example is merely used as an example. In actual application, there may be one or more MOS transistors and one or more triodes. The MOS transistor Q1 may be a PMOS transistor or an NMOS transistor. The MOS transistor Q2 may be a PMOS transistor or an NMOS transistor. The MOS transistor Q1 and the MOS transistor Q2 may have a same type or different types. The triode may be an NPN triode or a PNP triode. In addition, other switching components may be further used to replace the MOS transistors and the triode. This is not specifically limited herein. Similarly, quantities of other components (such as the energy storage capacitor and the current-limiting resistor) in the circuit each may be 1 or above, and need to be determined based on an actual situation. This is not specifically limited herein.

It can be learned that, when the power failure alarm circuit shown in FIG. 3 or FIG. 5 is applied to an optical module, the boost circuit is an APD boost circuit, and the source voltage input by the power input terminal may be specifically 3.3 V. After the source voltage is boosted by the APD boost circuit, a high voltage of 25 V to 35 V can be obtained. In this case, a current-limiting resistor whose resistance is 18 KΩ may be selected to limit a size of a charging current, so that a voltage for charging the energy storage capacitor is reduced to 11 V. Subsequently, the Zener diode is used to stabilize the 11 V charging voltage, and then the energy storage capacitor is charged to obtain an 11 V backup voltage. Finally, the 11 V backup voltage is bucked by the buck circuit to obtain a 3.3 V converted voltage, which is supplied to the optical module to continue working. In this implementation of this application, a high voltage is used to charge the energy storage capacitor. This imposes a lower capacitance requirement on the energy storage capacitor than that imposed when a low voltage is used to charge the energy storage capacitor. For example, three energy storage capacitors whose capacitance is 1 mF may be needed when the energy storage capacitors are charged by using a low voltage (3.3 V), whereas only one energy storage capacitor whose capacitance is 150 μF may be needed when the energy storage capacitor is charged by using a high voltage (25 V to 35 V). In addition, an energy storage capacitor of millifarads is a non-solid inline aluminum capacitor, and an energy storage capacitor of microfarads is a surface-mount capacitor and has a smaller volume than the in-line capacitor. Therefore, in this implementation of this application, a volume of the energy storage capacitor can be greatly reduced, thereby further reducing a volume of the PCB. Similarly, when the power failure alarm circuit shown in FIG. 3 or FIG. 5 is applied to power supply energy storage of an RTC chip, a high voltage (for example, 12 V) in a PCB board on which the RTC chip is located may be used to charge an energy storage capacitor. Then, the energy storage capacitor is used to provide a backup voltage for the RTC chip, so that the RTC chip can continue working when a main power supply encounters a power failure. Therefore, in this implementation of this application, a small-volume energy storage capacitor may be used to replace a large-volume backup battery, thereby reducing a volume of the RTC chip and a volume of the PCB.

Figure 7:
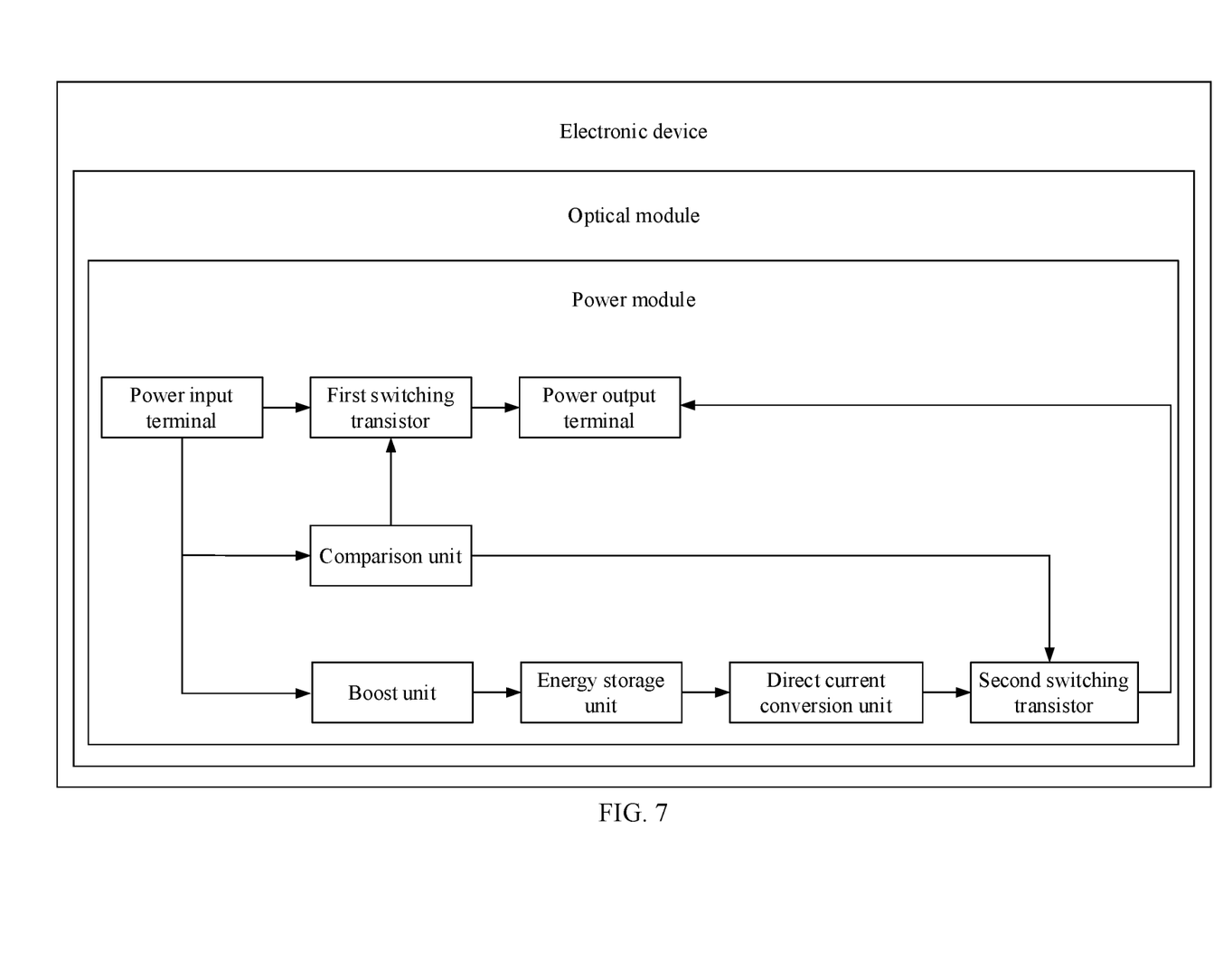
FIG. 7 shows an electronic device according to this application.

FIG. 7 shows an electronic device according to this application. The electronic device includes an optical module. The optical module includes a power input terminal, a power output terminal, a first switching transistor, a second switching transistor, a comparison unit, a boost unit, an energy storage unit, and a direct current conversion unit, where the power input terminal is connected to a first input terminal of the first switching transistor, and an output terminal of the first switching transistor is connected to the power output terminal;

the power input terminal is connected to an input terminal of the boost unit, an output terminal of the boost unit is connected to an input terminal of the energy storage unit, an output terminal of the energy storage unit is connected to an input terminal of the direct current conversion unit, an output terminal of the direct current conversion unit is connected to a first input terminal of the second switching transistor, and an output terminal of the second switching transistor is connected to the power output terminal;

the power input terminal is connected to a first input terminal of a comparison unit, a second input terminal of the comparison unit is configured to input a preset threshold, and an output terminal of the comparison unit is connected to a second input terminal of the first switching transistor and a second input terminal of the second switching transistor; and the first switching transistor is turned on and the second switching transistor is cut off when a source voltage input by the power input terminal to the comparison unit is greater than the preset threshold, where the source voltage is output to the power output terminal through the first switching transistor and is boosted by the boost unit to obtain a boosted voltage, and the boosted voltage is input to the energy storage unit for charging to obtain a backup voltage, where the boosted voltage is greater than the source voltage; or the first switching transistor is cut off and the second switching transistor is turned on when a source voltage input by the power input terminal to the comparison unit is less than or equal to the preset threshold, where the energy storage unit outputs a backup voltage to the direct current conversion unit, the backup voltage is bucked by the direct current conversion unit to obtain a converted voltage, and the converted voltage is output to the power output terminal through the second switching transistor, where the converted voltage is equal to the source voltage.

In a specific embodiment of this application, the energy storage unit includes a Zener diode and an energy storage capacitor, a negative electrode of the Zener diode is connected to the output terminal of the boost unit and the input terminal of the direct current conversion unit, a positive electrode of the Zener diode is grounded, and the Zener diode is connected to the energy storage capacitor in parallel.

In a specific embodiment of this application, the first switching transistor includes a phase inverter and a first MOS transistor, an input terminal of the phase inverter is connected to the comparison unit, an output terminal of the phase inverter is connected to an enable terminal of the first MOS transistor, an input terminal of the first MOS transistor is connected to the power input terminal, and an output terminal of the first MOS transistor is connected to the power output terminal; and the second switching transistor includes a second MOS transistor, an enable terminal of the second MOS transistor is connected to the output terminal of the comparison unit, an input terminal of the second MOS transistor is connected to the output terminal of the direct current conversion unit, and an output terminal of the second MOS transistor is connected to the power output terminal;

when the source voltage input by the power input terminal to the comparison unit is greater than the preset threshold, the comparison unit outputs a first level signal, the comparison unit outputs the first level signal to each of the phase inverter and the second MOS transistor, the first level signal passes through the phase inverter to obtain a second level signal, the second level signal is input to the enable terminal of the first MOS transistor so that the first MOS transistor is turned on, and the first level signal is input to the enable terminal of the second MOS transistor so that the second MOS transistor is cut off, where the first level signal and the second level signal are level signals having mutually inverted phases; and when the source voltage input by the power input terminal to the comparison unit is less than or equal to the preset threshold, the comparison unit outputs the second level signal, the comparison unit outputs the second level signal to each of the phase inverter and the second MOS transistor, the second level signal passes through the phase inverter to obtain the first level signal, the second level signal is input to the enable terminal of the first MOS transistor so that the first MOS transistor is cut off, and the second level signal is input to the enable terminal of the second MOS transistor so that the second MOS transistor is turned on.

In a specific embodiment of this application, the comparison unit is further configured to send the second level signal when the source voltage input by power input terminal to the comparison unit is less than or equal to the preset threshold, so as to report power failure information to the optical module and the electronic device.

In a specific embodiment of this application, the boost unit is an APD boost circuit.

For simplicity, the foregoing describes only a composition and a connection relationship of the power failure alarm circuit of the optical module in the electronic device. The electronic device may be an ONU device, or may be another optical communications device. This is not specifically limited herein. In addition, for details of the power failure alarm circuit of the optical module, refer to FIG. 3 to FIG. 6 and related descriptions thereof. Details are not described herein again.

When an optical module is disposed in the foregoing electronic device, and a high voltage output by the APD boost circuit is used in the optical module to charge the energy storage capacitor, the energy storage capacitor can be used to supply power to the optical module upon a power failure of the source voltage of the optical module. In the foregoing electronic device, because the high voltage output by the APD boost circuit inside the optical module is used to charge the energy storage capacitor, a capacity of the energy storage capacitor can be reduced without additionally adding a power boost chip, so that a volume of the energy storage capacitor is greatly reduced, and a volume of the optical module is also accordingly reduced, thereby reducing manufacturing costs.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a storage disk, or a magnetic tape), an optical medium (for example, a DVD), or a semiconductor medium (for example, a solid-state drive (SSD)). In the foregoing embodiments, the description of each embodiment has respective focuses. For a part that is not described in detail in an embodiment, refer to related descriptions in other embodiments.

In the several embodiments provided in this application, it should be understood that the disclosed device may be implemented in other manners. For example, the described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented through hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the conventional technologies, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium may include: any medium that can store program code, such as a removable hard disk, a read-only memory, a random access memory, a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A circuit module, comprising a power input terminal, a power output terminal, a first switching transistor, a second switching transistor, a comparison unit, a boost unit, an energy storage unit, and a direct current conversion unit, wherein:
   the power input terminal is connected to a first input terminal of the first switching transistor, wherein an output terminal of the first switching transistor is connected to the power output terminal;
   the power input terminal is connected to an input terminal of the boost unit, an output terminal of the boost unit is connected to an input terminal of the energy storage unit, an output terminal of the energy storage unit is connected to an input terminal of the direct current conversion unit, an output terminal of the direct current conversion unit is connected to a first input terminal of the second switching transistor, and an output terminal of the second switching transistor is connected to the power output terminal;

the power input terminal is connected to a first input terminal of the comparison unit, a second input terminal of the comparison unit is configured to input a preset threshold, and an output terminal of the comparison unit is connected to a second input terminal of the first switching transistor and a second input terminal of the second switching transistor; and the first switching transistor is turned on and the second switching transistor is cut off when a source voltage input by the power input terminal to the comparison unit is greater than the preset threshold, wherein the source voltage is output to the power output terminal through the first switching transistor and is boosted by the boost unit to obtain a boosted voltage, and the boosted voltage is input to the energy storage unit for charging to obtain a backup voltage, wherein the boosted voltage is greater than the source voltage; or the first switching transistor is cut off and the second switching transistor is turned on when a source voltage input by the power input terminal to the comparison unit is less than or equal to the preset threshold, wherein the energy storage unit outputs a backup voltage to the direct current conversion unit, the backup voltage is bucked by the direct current conversion unit to obtain a converted voltage, and the converted voltage is output to the power output terminal through the second switching transistor, wherein the converted voltage is equal to the source voltage.

2. The circuit module according to claim 1, wherein the energy storage unit comprises a Zener diode and an energy storage capacitor, a negative electrode of the Zener diode is connected to the output terminal of the boost unit and the input terminal of the direct current conversion unit, a positive electrode of the Zener diode is grounded, and the Zener diode is connected to the energy storage capacitor in parallel.

3. The circuit module according to claim 1, wherein:

the first switching transistor comprises a phase inverter and a first metal oxide semiconductor (MOS) transistor, an input terminal of the phase inverter is connected to the comparison unit, an output terminal of the phase inverter is connected to an enable terminal of the first MOS transistor, an input terminal of the first MOS transistor is connected to the power input terminal, and an output terminal of the first MOS transistor is connected to the power output terminal;

the second switching transistor comprises a second MOS transistor, an enable terminal of the second MOS transistor is connected to the output terminal of the comparison unit, an input terminal of the second MOS transistor is connected to the output terminal of the direct current conversion unit, and an output terminal of the second MOS transistor is connected to the power output terminal;

that the first switching transistor is turned on and the second switching transistor is cut off when a source voltage input by the power input terminal to the comparison unit is greater than the preset threshold comprises:

when the source voltage input by the power input terminal to the comparison unit is greater than the preset threshold, the comparison unit outputs a first level signal, the comparison unit outputs the first level signal to each of the phase inverter and the second MOS transistor, the first level signal passes through the phase inverter to obtain a second level signal, the second level signal is input to the enable terminal of the first MOS transistor to cause the first MOS transistor to be turned on, and the first level signal is input to the enable terminal of the second MOS transistor to cause the second MOS transistor to be cut off, wherein the first level signal and the second level signal are level signals having mutually inverted phases; and that the first switching transistor is cut off and the second switching transistor is turned on when the source voltage input by the power input terminal to the comparison unit is less than or equal to the preset threshold comprises:

when the source voltage input by the power input terminal to the comparison unit is less than or equal to the preset threshold, the comparison unit outputs the second level signal, the comparison unit outputs the second level signal to each of the phase inverter and the second MOS transistor, the second level signal passes through the phase inverter to obtain the first level signal, the first level signal is input to the enable terminal of the first MOS transistor to cause the first MOS transistor to be cut off, and the second level signal is input to the enable terminal of the second MOS transistor to cause the second MOS transistor to be turned on.

4. The circuit module according to claim 3, wherein the comparison unit is further configured to send the second level signal when the source voltage input by the power input terminal to the comparison unit is less than or equal to the preset threshold.

5. The circuit module according to claim 1, wherein the circuit module is applied to an optical module, and the boost unit is an avalanche photodiode (APD) boost circuit.

6. An electronic device, comprising an optical module, wherein the optical module comprises a power input terminal, a power output terminal, a first switching transistor, a second switching transistor, a comparison unit, a boost unit, an energy storage unit, and a direct current conversion unit, wherein:

the power input terminal is connected to a first input terminal of the first switching transistor, and an output terminal of the first switching transistor is connected to the power output terminal;

the power input terminal is connected to an input terminal of the boost unit, an output terminal of the boost unit is connected to an input terminal of the energy storage unit, an output terminal of the energy storage unit is connected to an input terminal of the direct current conversion unit, an output terminal of the direct current conversion unit is connected to a first input terminal of the second switching transistor, and an output terminal of the second switching transistor is connected to the power output terminal;

the power input terminal is connected to a first input terminal of the comparison unit, a second input terminal of the comparison unit is configured to input a preset threshold, and an output terminal of the comparison unit is connected to a second input terminal of the first switching transistor and a second input terminal of the second switching transistor; and the first switching transistor is turned on and the second switching transistor is cut off when a source voltage input by the power input terminal to the comparison unit is greater than the preset threshold, wherein the source voltage is output to the power output terminal through the first switching transistor and is boosted by the boost unit to obtain a boosted voltage, and the boosted voltage is input to the energy storage unit for charging to obtain a backup voltage, wherein the boosted voltage is greater than the source voltage; or the first switching transistor is cut off and the second switching transistor is turned on when the source voltage input by the power input terminal to the comparison unit is less than or equal to the preset threshold, wherein the energy storage unit outputs the backup voltage to the direct current conversion unit, the backup voltage is bucked by the direct current conversion unit to obtain a converted voltage, and the converted voltage is output to the power output terminal through the second switching transistor, wherein the converted voltage is equal to the source voltage.

7. The device according to claim 6, wherein the energy storage unit comprises a Zener diode and an energy storage capacitor, a negative electrode of the Zener diode is connected to the output terminal of the boost unit and the input terminal of the direct current conversion unit, a positive electrode of the Zener diode is grounded, and the Zener diode is connected to the energy storage capacitor in parallel.

8. The device according to claim 6, wherein:

the first switching transistor comprises a phase inverter and a first metal oxide semiconductor (MOS) transistor, an input terminal of the phase inverter is connected to the comparison unit, an output terminal of the phase inverter is connected to an enable terminal of the first MOS transistor, an input terminal of the first MOS transistor is connected to the power input terminal, and an output terminal of the first MOS transistor is connected to the power output terminal;

the second switching transistor comprises a second MOS transistor, an enable terminal of the second MOS transistor is connected to the output terminal of the comparison unit, an input terminal of the second MOS transistor is connected to the output terminal of the direct current conversion unit, and an output terminal of the second MOS transistor is connected to the power output terminal;

that the first switching transistor is turned on and the second switching transistor is cut off when a source voltage input by the power input terminal to the comparison unit is greater than the preset threshold comprises:

when the source voltage input by the power input terminal to the comparison unit is greater than the preset threshold, the comparison unit outputs a first level signal, the comparison unit outputs the first level signal to each of the phase inverter and the second MOS transistor, the first level signal passes through the phase inverter to obtain a second level signal, the second level signal is input to the enable terminal of the first MOS transistor to cause the first MOS transistor to be turned on, and the first level signal is input to the enable terminal of the second MOS transistor to cause the second MOS transistor to be cut off, wherein the first level signal and the second level signal are level signals having mutually inverted phases; and that the first switching transistor is cut off and the second switching transistor is turned on when the source voltage input by the power input terminal to the comparison unit is less than or equal to the preset threshold comprises:

when the source voltage input by the power input terminal to the comparison unit is less than or equal to the preset threshold, the comparison unit outputs the second level signal, the comparison unit outputs the second level signal to each of the phase inverter and the second MOS transistor, the second level signal passes through the phase inverter to obtain the first level signal, the second level signal is input to the enable terminal of the first MOS transistor to cause the first MOS transistor to be cut off, and the second level signal is input to the enable terminal of the second MOS transistor to cause the second MOS transistor to be turned on.

9. The device according to claim 8, wherein the comparison unit is further configured to send the second level signal when the source voltage input by the power input terminal to the comparison unit is less than or equal to the preset threshold.

10. The device according to claim 6, wherein the boost unit is an avalanche photodiode (APD) boost circuit.

* * * * *